(12) United States Patent
Parekh et al.

(10) Patent No.: US 7,257,833 B1
(45) Date of Patent: *Aug. 14, 2007

(54) ARCHITECTURE FOR AN INTEGRATED POLICY ENFORCEMENT SYSTEM

(75) Inventors: Pankaj S. Parekh, San Jose, CA (US); Vimal Vaidya, Fremont, CA (US); Sandeep Gupta, New Delhi (IN); Pranav Shah, Saratogoa, CA (US)

(73) Assignee: Ipolicy Networks, Inc., Fremont, CA (US)

( * ) Notice: Subject to any disclaimer, the term of this patent is extended or adjusted under 35 U.S.C. 154(b) by 738 days.

This patent is subject to a terminal disclaimer.

(21) Appl. No.: 10/052,745

(22) Filed: Jan. 17, 2002

Related U.S. Application Data

(60) Provisional application No. 60/262,275, filed on Jan. 17, 2001.

(51) Int. Cl.
*H04L 9/00* (2006.01)
(52) U.S. Cl. .......................................................... 726/1
(58) Field of Classification Search ................ 713/200, 713/201; 726/1
See application file for complete search history.

(56) References Cited

U.S. PATENT DOCUMENTS 6,075,798 A * 6/2000 Lyons et al. ................. 370/474
6,587,466 B1 * 7/2003 Bhattacharya et al. . 370/395.21

* cited by examiner

*Primary Examiner*—Kambiz Zand
*Assistant Examiner*—Jacob Lipman
(74) *Attorney, Agent, or Firm*—Thelen Reid Brown Raysman & Steiner LLP

(57) ABSTRACT

Enforcing a plurality of different policies on a stream of packets is disclosed. In lieu of running separate algorithms for each policy, the system exploits the commonalities of all of the policies. The conditions corresponding to the compiled rules are arranged in a condition tree and processed in a pipelined architecture that allows the results of the various stages to be carried forward into subsequent stages of processing. The rules for which all conditions have been satisfied can be identified by one stage of processing in one pass of condition tree traversal and are passed to subsequent stages. A rule table corresponding to an individual policy type can then be readily examined to determine partial or complete satisfaction of the rule of that policy type, without requiring a re-examination of the conditions underlying the rule. Additionally, corresponding actions can be taken where rule satisfaction is determined. This approach allows extremely high-speed policy enforcement performance.

22 Claims, 12 Drawing Sheets

ARCHITECTURE FOR AN INTEGRATED POLICY ENFORCEMENT SYSTEM

CROSS REFERENCE TO RELATED APPLICATIONS

This application claims priority under 35 U.S.C. § 119(e) to U.S. Provisional Application No. 60/262,275, filed Jan. 17, 2001, and entitled "Architecture for an Integrated Policy Enforcement System," which is incorporated by reference herein in its entirety.

This application is also related to application Ser. No. 09/956,394, now U.S. Pat. No. 7,120,144, filed on Sep. 18, 2001, and entitled "Universal Application Decode Engine," and application Ser. No. 10/052,328, now U.S. Pat. No. 7,058,821, filed on Jan. 17, 2002, and entitled "System and Method for Detection of Intrusion Attacks on Packets Transmitted on a Network", which are incorporated by reference herein in their entirety.

BACKGROUND OF THE INVENTION

1. Field of the Invention

This application relates generally to policy enforcement and more particularly to efficient enforcement of multiple policies on a stream of packets.

2. Description of the Related Art

The increase of traffic and security threats on the Internet and the demand for high performance have created a need for mechanisms that enable Service Providers (SP) to provide safer, faster and more reliable networks and servers to their customers. However, current network architectures lack tools that can enable SP to provide integration of various security and performance enhancement policies along with aggregation of different customer traffic, particularly at wire speed. This has impacted them adversely in terms of customer confidence in their ability to provide a secure and reliable network infrastructure. What is therefore needed is a device that can enable the SP to better provide these capabilities. Additionally, the ability to selectively offer these services would be a potential SP revenue source.

In the past, vendors have attempted to perform the policy enforcement for IP networks through various devices. These devices can be broadly classified into the following four types of devices: standalone systems that enforce unique (fixed) policies; switches that enforce limited policies; routers that enforce a limited set of policies; and integrated policy enforcement systems.

Standalone systems are designed to enforce specific policies, typically through a rigid algorithm implemented in software or hardware. Examples are FIREWALL™ from Checkpoint Software Technologies LTD, and Internet Security Systems (ISS) intrusion detection systems. While these systems offer adequate functionality in the right environment, they are inflexible where various policies need to be introduced, and would not adequately support high-speed systems.

Switches provide the basic switching capabilities at the Open Systems Interconnection (OSI) reference model layer two. They also occasionally integrate Firewall (FW), Load Balancing (LB) or Quality of Service (QoS) capabilities. Since the switching is performed mostly through ASICs across various switching ports, it does not have capabilities to implement the deep packet inspection before making policy decisions.

Routers primarily route network packets at OSI layer three. They also have started to integrate additional IP service functionalities while routing the network traffic. However, these devices utilize the limited additionally available processing capabilities of the routing processor to make policy decisions. Their ability to make wire speed decisions is thus very limited.

Finally, there are integrated policy enforcement systems. Traditionally, vendors who have built integrated policy enforcement systems have built them by running the policy enforcement software on a general purpose computing platform integrated with their proprietary logic for packet delivery. This rigid approach generally allows the enforcement of policies in specific environments but does not offer flexibility or the capability of delivering enforcement at high speeds, for reasons similar to those found in stand-alone systems.

Thus, what is needed is a flexible policy enforcement engine that can handle multiple different sets of enforcement policies and that has an architecture that facilitates such enforcement at high speeds.

SUMMARY OF THE INVENTION

The described embodiments of the present invention facilitate improved enforcement of numerous policy rules belonging to numerous policy types for communications traversing a packet switched network.

These policy rules may belong to various different policy types. For example, a firewall (FW) policy, a quality of service (QoS) policy, an intrusion detection system (IDS) policy, a load balancing (LB) policy, and other types of policies are enforceable. According to one aspect of the present invention, policy rule enforcement implements a pipelined approach that initially examines a stream of packets for the presence of conditions common to the various policy types, maintains the results of those examinations, and then allows further examination of the stream of packets for the presence of conditions particular to the individual policy types.

In one aspect, policy enforcement in accordance with the present invention implements numerous different policies, each having its own policy rules. Instead of running separate algorithms for each policy as is done with conventional systems, the system exploits the commonalities of all of the policies, as previously extracted through rule compilation. The conditions corresponding to the compiled rules are arranged in a condition tree and processed in a pipelined architecture that allows the results of the various stages to be carried forward into subsequent stages of processing. The rules for which all conditions have been satisfied may be identified by a stage of processing in one pass of condition tree traversal, with the resulting match being passed to subsequent stages. A rule table corresponding to an individual policy type can then be readily examined to determine partial or complete satisfaction of the rule of that policy type, without requiring a re-examination of the conditions underlying the rule. Additionally, corresponding actions can be taken where rule satisfaction is determined. This approach allows extremely high-speed policy enforcement performance relative to conventional systems.

In one embodiment, enforcing a plurality of different policies on a stream of packets is accomplished by receiving packets and extracting information such as from the packet header corresponding to different (e.g., OSI) layers and making the extracted information available in a packet extension so that subsequent processing stages do not have to refer back to the packet itself again for the same information. For example, an extension builder processing stage can mark an examined packet as an IP protocol packet where such is determined. This information is found in the packet extension and may be used by subsequent stages to select only those rules that have a condition of packet protocol being IP. This condition may be part of many rules of the same or of different policy types.

In one embodiment, the packet may be appended with an extension having a number of bits. Information required for matching conditions is mapped to bit location(s) within the extension. The information may be extracted from the packet headers or may be derived information based on the information in packet and compiled rules. Thus, the value in a particular bit (or bits, or byte) location can indicate satisfaction of a condition or provide information that can be used by subsequent stages to check matching conditions. For example, a particular bit location in the extension may be assigned a value (e.g., "1") where it is determined that its corresponding packet has been determined to be an IP protocol packet. With the packet extension, the satisfaction of a condition can thus be passed to another processing level, without requiring that other processing level to examine the packet again to determine the satisfaction of the condition. As another example, based on the source port and destination port in the packet and the compiled rules, the application a packet belongs to is identified and marked in the extension, which is later used by another stage to check a particular value of the application as a condition for a rule.

The processing of packets continues at multiple levels, with each level examining the packets (directly or indirectly, in the case where higher level protocols evident from numerous associated packets are examined for the satisfaction of conditions) to determine whether they satisfy conditions, with appropriate marking of packets.

In some instances, the packets may be processed to an extent before it is determined whether they collectively reflect the satisfaction of a condition. For example, session level processing may create a session comprising numerous packets and determine whether a condition evident at the session level has been satisfied, and then mark the corresponding packets by updating their extensions. Further, an ongoing transaction in an application can be identified by analyzing multiple packets from a session and marking the packets regarding the ongoing transaction.

Updating the extensions continues as the processing of the packets progresses to iteratively higher levels, up to the application level and beyond.

Preferably, each policy rule belongs to a rule tree. Additionally, a rule tree may cover all of the policy rules for all policy types. A rule tree has a number of conditions that reside at the various processing levels. In one sense, the rule trees for all of the policy rules dictate how the packets are examined as they are processed, by collectively providing the conditions whose presence is detected in the processing of the stream of packets. Additionally, at an end of rule processing for a packet, the result of the rule processing allows ready examination of rules that have been matched for each policy type. Packets do not need to be re-examined to determine rules matched for each policy type. One traversal of the rule tree may identify all of the rules matched for all policy types.

The rule trees may be invoked during processing by the common set of sub-modules or during processing within the individual policy rule engines.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

As used herein, the term packets broadly refers to units of data that are sent on any packet-switched network or the like, and encompasses Transmission Control Protocol/Internet Protocol (TCP/IP) packets, User Datagram Protocol (UDP) packets, which may also be referred to as datagrams, or any other such units of data.

Figure 1:
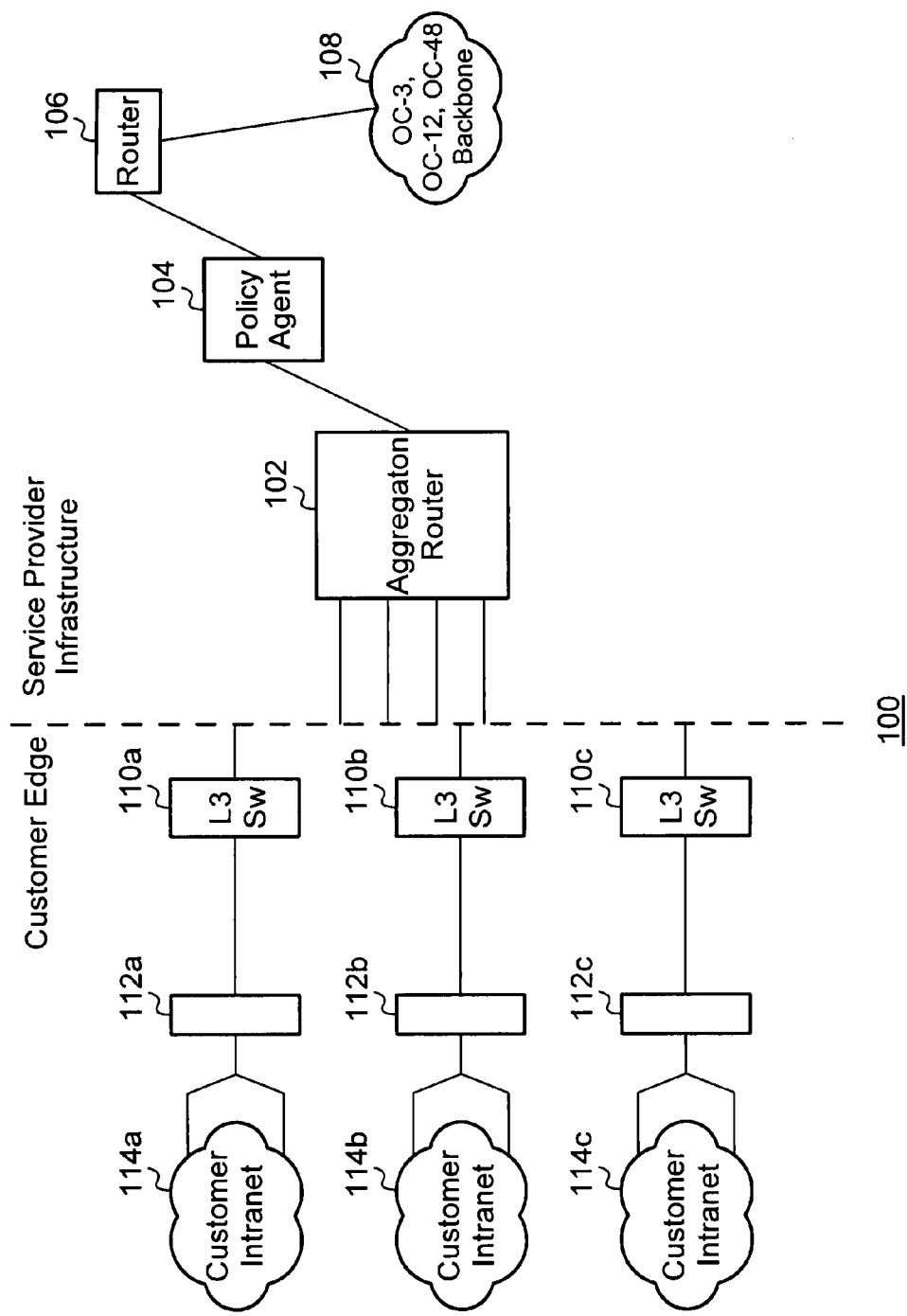
FIG. 1 is a schematic diagram illustrating an example of a system in which a policy agent operates in accordance with the present invention operates.

The block diagram of FIG. 1 illustrates an example of a system 100 in which the policy agent 104 operates. The policy agent 104 may be variously embodied in software, hardware, or a combination thereof as described below. The policy agent 104 may be embodied in a product such as the ipEnforcer 5000® as provided by iPolicy Networks, Inc. of Fremont, Calif. The system 100 illustrates service provider infrastructure including an aggregation router 102, the policy agent 104, and a router 106, which is in turn connected to a network (e.g. Internet) backbone 108. Within the customer edge of the network resides routers 110*a-c*, gateway servers 112*a-c* and customer intranets 114*a-c*. With the exception of the policy agent 104, the elements and the interconnection of the elements in the system 100 of FIG. 1 are conventional. The policy agent 104 receives packets inline within the service provider infrastructure and enforces numerous policy rules belonging to numerous policy types for the packets and corresponding communications found therein. The policy rules may belong to various different policy types, including but not limited to firewall (FW), quality of service (QoS), intrusion detection system (IDS), load balancing (LB), and others.

This is but one example of a system in which the policy agent 104 operates. There are others. For example, the policy agent 104 may be connected in streamlined fashion wherein the policy agent 104 is not inline between the router and the aggregation router, but corresponds independently with the aggregation router. The ordinarily skilled artisan will readily recognize the various alternatives.

Generally, the policy agent acts as an IP packet rule enforcement engine which enforces the policies defined on the stream of IP packets which are passed to it and in the process of policy enforcement impacts the IP packet stream in such a way that certain flows of IP packets which meet defined conditions of policy rules are impacted by the actions defined in the respective policy rules. Specifically, the policy agent 104 is able to decode the IP packets flowing through it up to application layer (of OSI 7 layer model), identify the transaction(s) of the application and any associated parameters of the transaction in real time (at high speeds of the order of Gigabits/sec and above) and then impact the IP stream in such a way that IP packets or flows of IP packets endorse the policy rules specified by the system administrator.

The policy enforcement system implemented by the policy agent 104 integrates numerous different policy types, each having its own policy rules. Instead of running separate algorithms for each policy as is done with conventional systems, the system implements the commonalities of all of the policies, extracted through rule compilation. The conditions corresponding to the compiled rules are processed in a pipelined architecture that allows the results of the various stages to be carried forward into subsequent stages of processing. This approach allows a device built using the policy agent architecture to deliver very high-speed (multi-gigabit) policy enforcement capabilities.

Figure 2:
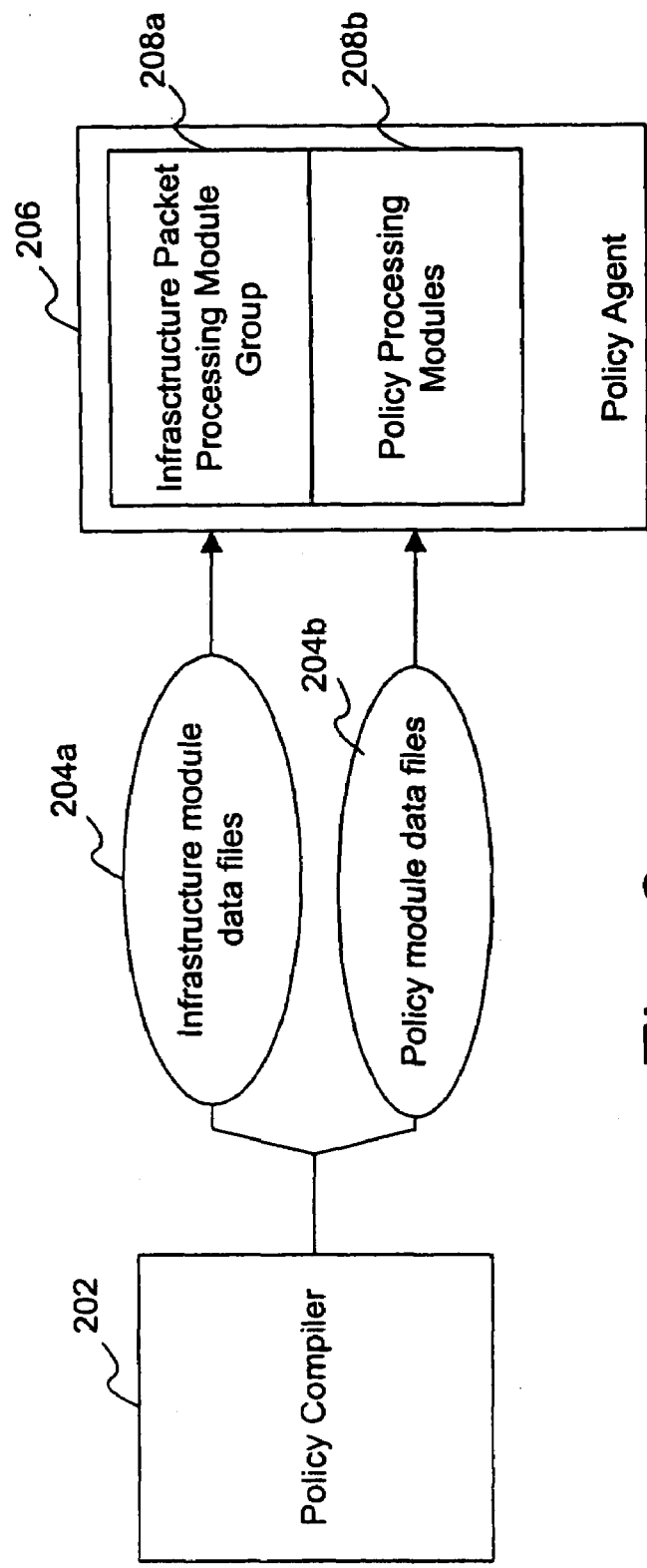
FIG. 2 is a schematic diagram illustrating the relationship between a policy compiler and a policy agent.

The schematic diagram of FIG. 2 generally illustrates the relationship between compiled policies and the corresponding components of a PA 206. A policy compiler 202 produces infrastructure module data files 204a and policy module data files 204b that respectively correspond to the above described rule condition commonalities and individual policies. These data files are passed to the PA 206, which includes an infrastructure packet processing module group 208a and a series of policy processing modules 208b. Each individual policy processing module 208b shares the same common infrastructure module group 208a. But, they all uniquely implement the specific processing routines appropriate to the application they serve. Each individual policy engine implements the common infrastructure processing module group 208a and the appropriate policy processing module 208b. For example, a firewall (FW) policy engine is implemented using two sub-modules: a common infrastructure module and a specific FW policy module. Similarly, an intrusion detection system (IDS) policy engine is implemented using the common infrastructure module group and a specific IDS policy module.

The policy compiler 202 mixes all implemented policies to extract the commonalities from them and store them in the form of the two separate sets of data files 204a, 204b. There will be various ways to extract the commonalities and provide the two separate sets of data files. For example, the commonalities can be extracted automatically, by human examination of the rules and corresponding conditions within all implemented policies, or through combinations thereof. While examples of the functionality of the infrastructure and policy module data files and are described herein, the process of extracting the data files by the policy compiler may be variously implemented and the present invention is not necessarily so limited.

The PA may also be implemented in conjunction with a policy manager that downloads the policy rules to the PA, with each individual policy engine (e.g., FW, QoS, etc.) being responsible for enforcing its respective policies.

Figure 3:
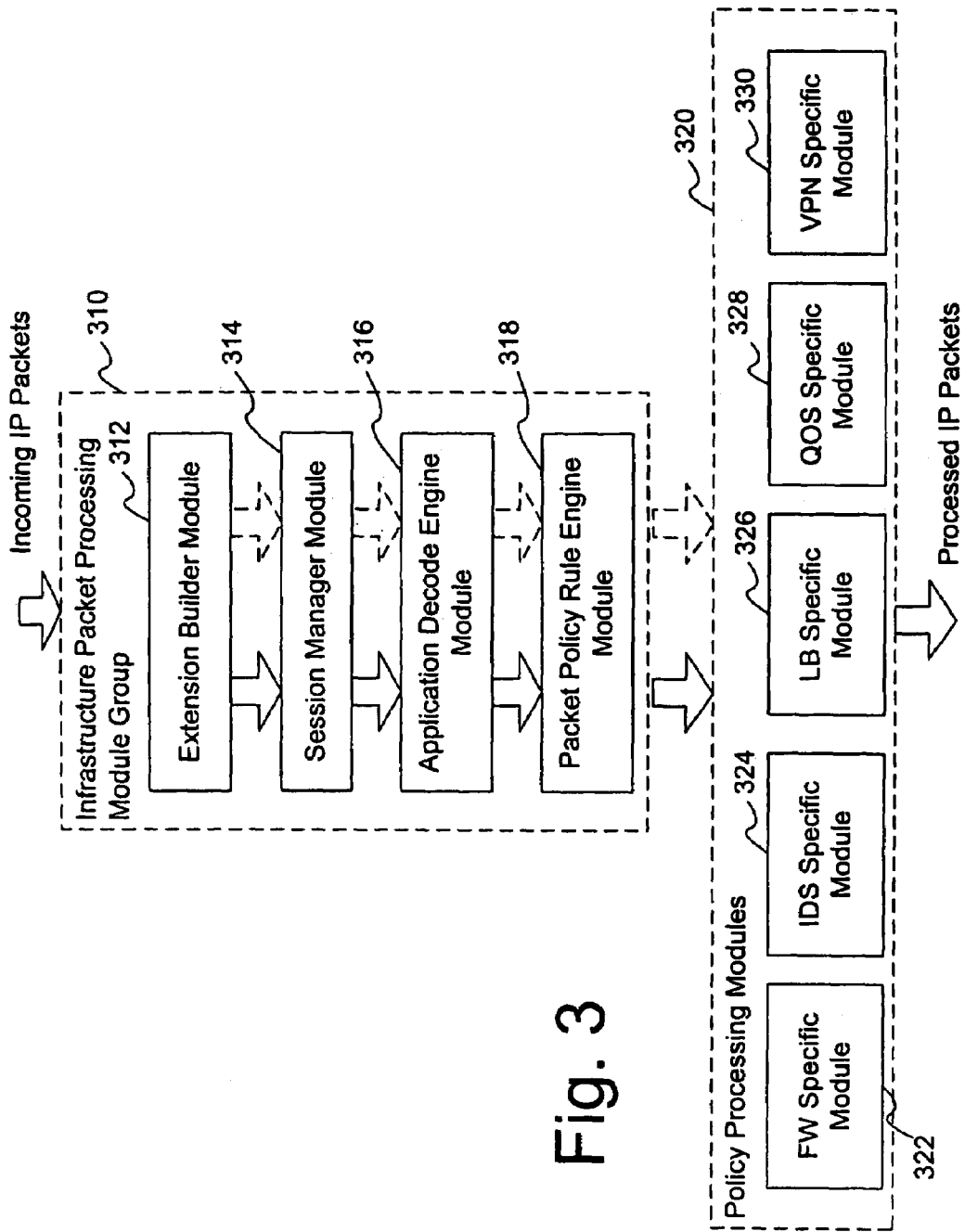
FIG. 3 is a block diagram illustrating an embodiment of a policy agent architecture in accordance with the present invention.

FIG. 3 illustrates an embodiment of policy agent architecture 300 in more detail. The major module groups include the infrastructure packet processing module group 310 and the policy processing modules 320. These two modules 310, 320 are preferably implemented in software, but could be implemented in hardware, firmware, or any combination thereof. The pipelined architecture of the software allows a pipelined architecture of hardware to be implemented to provide enough processing power to carry out the processing required by each individual module at line rate. Since the communication between the modules takes place using the packet extension, no shared memory architecture is required between the processing modules allowing a very low latency memory access as well as distributed processing. The infrastructure packet processing module group 310 comprises an extension builder module 312 ("extension builder 312"), a session manager module 314 ("session manager 314"), an application decode engine module 316 ("application decode engine 316"), and a packet policy rule engine module 318 ("packet policy rule module 318"). These modules 312-318 process the incoming packet stream, acting upon the extracted commonalities of the various policies enforced by the policy agent architecture 300, such as FW, IDS, load balancing (LB), QoS, virtual private network (VPN), and others. It also takes the understanding of networking protocol layers and breaks the processing capabilities accordingly across multiple sub-modules.

The solid arrows in the figure depict the flow of packets through the policy agent modules, whereas the dotted line arrows depict the flow of information appended to the packets. As is evident from the diagram, the policy agent receives and outputs ordinary packets and therefore operates seamlessly. Of course, should certain policy rules apply, certain packets will be interrupted by the policy agent architecture 300 as needed, such as in the case of the detection of an attack according to an IDS policy.

The extension builder 312 first processes the OSI layer two and three information. This information is available through frame and packet headers. The extension builder 312 then provides the result of this analysis to other modules so that they can use this information directly without requiring the information to be processed again. For example, the packet length field, which is encoded in the header, can be decoded once and used again by all other processing entities. Although various mechanisms may be used to maintain the association of rule matching information to the packets as they traverse the pipelined modules 312-316, 320, preferably each relevant packet is appended with an extension, which can be readily examined by the rule engine 318 to determine the rule matches corresponding to a processed packet.

The extension builder 312 passes the packets, having the appended extension, to the session manager 314, which uses the information generated by the extension builder 312 and processes the next layer of networking protocols. For example, it identifies the information related to TCP, UDP and other relevant sessions. Also, the session manager 314 evaluates packets for the policies and identifies and marks information that is applicable for all packets of a session. As an example, the customer ID of a customer with which a session is associated is identified and marked in the packet extension by the session manager 314. This provides the mechanism to establish the correlation of various packets for the same session. The session manager 314 similarly updates the appended extensions and passes the appended packets along the processing pipeline to the application decode engine 316.

The application decode engine 316 utilizes the understanding of various applications passing over the established TCP/UDP sessions and tracks the packets as they transition from one application state to the next. It also correlates various TCP/UDP sessions that are related to the same application instance. It accomplishes this by utilizing the session information presented by the session manager 314 and an application state transition flow chart that can be provided among the infrastructure data files. By processing up to the application layer, the policy agent architecture 300 is able to extract knowledge from the header as well as data portion of the processed packets, thus providing valuable high level policy enforcement functionality. The application decode engine 316 similarly passes the appended packets along to the packet policy rule engine 318.

The packet policy rule engine 318 uses the information generated by the three previous infrastructure modules 312-316 and has the ability to make the policy decisions, generally implementing routines that analyze the packets and compare them with a wide range of policy rules. It identifies partial or complete rule matching and passes that information along to the specific policy processing modules 320 via the packet extension.

The functionality of the extension builder 312, session manager 314, application decode engine 316 and packet policy rule engine 318 is described further below, with reference to the flow diagrams of FIGS. 4-7 and the corresponding policy rule tables.

With the policy commonalities having been processed by the infrastructure packet processing module group 310, the packets are conceptually passed along to the policy processing modules 320 for respective enforcement of various individual policies. Although the invention is not so limited, and may operate on more, less, or different policy types than those shown in the figure, the shown policy processing modules 320 include an FW specific module 322, an IDS specific module 324, an LB specific module 326, a QoS specific module 328 and a VPN specific module 330. These modules analyze the packets further as needed, and implement the results based on extensions generated by the infrastructure packet processing module group 310. With this architecture, the performance of every policy specific module is made more efficient as policy enforcement processing common to each policy has already been performed. Additionally, the collective enforcement of policies is greatly improved as the commonalities are processed once, in lieu of repeating the same examination for multiple policies.

Each policy specific module 322-330 performs the appropriate actions on the packets as required by its policy rules. They also raise appropriate alarms if required. As previously indicated, the policy agent architecture 300 may also be supported by a policy manager that is responsible for configuring the policies/rules to be enforced by the PA 300 and hence its policy engines.

Additionally, this architecture accommodates various new policies since it distributes the responsibility to analyze the packet on the infrastructure component while keeping the policy specific action implementation locally within the module. The following flow charts and tables illustrate how commonalities extracted from various policies, and corresponding packet processing to apply those policies is optimized through the pipelined, modular architecture.

The infrastructure modules can be variously implemented. However, the infrastructure module functionality of the present invention allows efficient (e.g. wire rate) policy enforcement performance even where the architecture is embodied in conventional "off the shelf" hardware. Alternatively, the infrastructure modules can be embodied in the form of a custom designed ASIC, or otherwise. The policy processing modules can be similarly implemented. Typically, the infrastructure module group will perform much of the processing, so the policy processing module would not require the same processing capabilities, but embodiments will vary and are not limited by this description.

Table 1.0 (below) lists two rules from each of FW, IDS and QoS policy types. The system administrator may variously (locally, remotely) set up these sets of rules. The table illustrates the commonalities in the sets of expressions to be evaluated. The table indicates the number for each rule, the policy type, a general description of the rule, the conditions corresponding to the rule, and the action to be performed if the conditions in the rule are found matching. This table is provided to ease the understanding of the invention. Various alternatives may be provided.

TABLE 1.0

Policy Rules

| Number | Type of Policy | Description | Condition | Action |
|---|---|---|---|---|
| 1 | Firewall | Allow any incoming http session to server 19.18.10.1 | L3 == IP && L4 == TCP && Outside_IP == Any && Inside_IP == 19.18.10.1 && Session_Direction == Incoming && Application_ID == HTTP | Allow |
| 2 | Firewall | Allow any employee to surf the web | L3 == IP && L4 == TCP && Outside_IP == Any && Inside_IP is_part_of Employee_IP_list && Session_Direction == Outgoing && Application_ID == HTTP | Allow |
| 3 | QoS | Reserve 500 kbps bandwidth to any incoming http request to company's web servers | L3 == IP && L4 == TCP && Outside_IP == Any && Inside_IP is_part_of web_svr_IP_list && Session_Direction == Incoming && Application_ID == HTTP | Aggregate And Allocate Bandwidth up to 500 kbps |

TABLE 1.0-continued

Policy Rules

| Number | Type of Policy | Description | Condition | Action |
| --- | --- | --- | --- | --- |
| 4 | QoS | Allocate 200 kbps bandwidth to anyone from marketing group when they need to run selected marketing applications during work hours | L3 == IP && L4 == TCP && Outside_IP == Any && Inside_IP is_part_of marketing_subnet && Session_Direction == Outgoing && Application_ID is_part_of Mkt_App_Grp && Time_of_the_day is work_hours | Aggregate And Allocate Bandwidth up to 200 kbps |
| 5 | IDS | Winnuke attack | L3 == IP && L4 == TCP && Outside_IP == Any && Inside_IP == Any && Pkt_DIR == Incoming && Application_ID == 139 && TCP_FLAGS == TCP + URG | Identify Attach Winnuke && Send an alarm |
| 6 | IDS | ICMP Smurf attack | L3 == IP && L4 == ICMP && Inside_IP == IP_BROADCAST && Pkt_DIR == Incoming && ICMP_CODE == 8 | Identify Attack Icmp_Smurf && Send an alarm |

As is evident from the table, three different types of policy rules are illustrated. The conditions for the various rules reflect the commonalities at various processing levels. For example, although other protocols could be detected, one of the conditions corresponding to each of policy rules 1-6 is that the level three protocol is the Internet Protocol (IP). Additionally, some of the rules (1-5) require as a condition a determination that the packet is a TCP packet. At higher levels, an indication of a particular network address for a session, a direction for a session, or whether a user from a particular group is involved may correspond to a condition. Some conditions in a rule may not have a condition common to another rule. Some conditions are specific to a rule (or possibly to rules within a rule type). Most of the conditions are determinable by the common infrastructure modules. Only those conditions that are very specific to a policy processing module are detected by the appropriate specific policy processing module. In such cases, infrastructure modules do a partial rule match (i.e., common conditions are matched) and the rest of the conditions are evaluated by the specific policy processing module.

Figure 4:
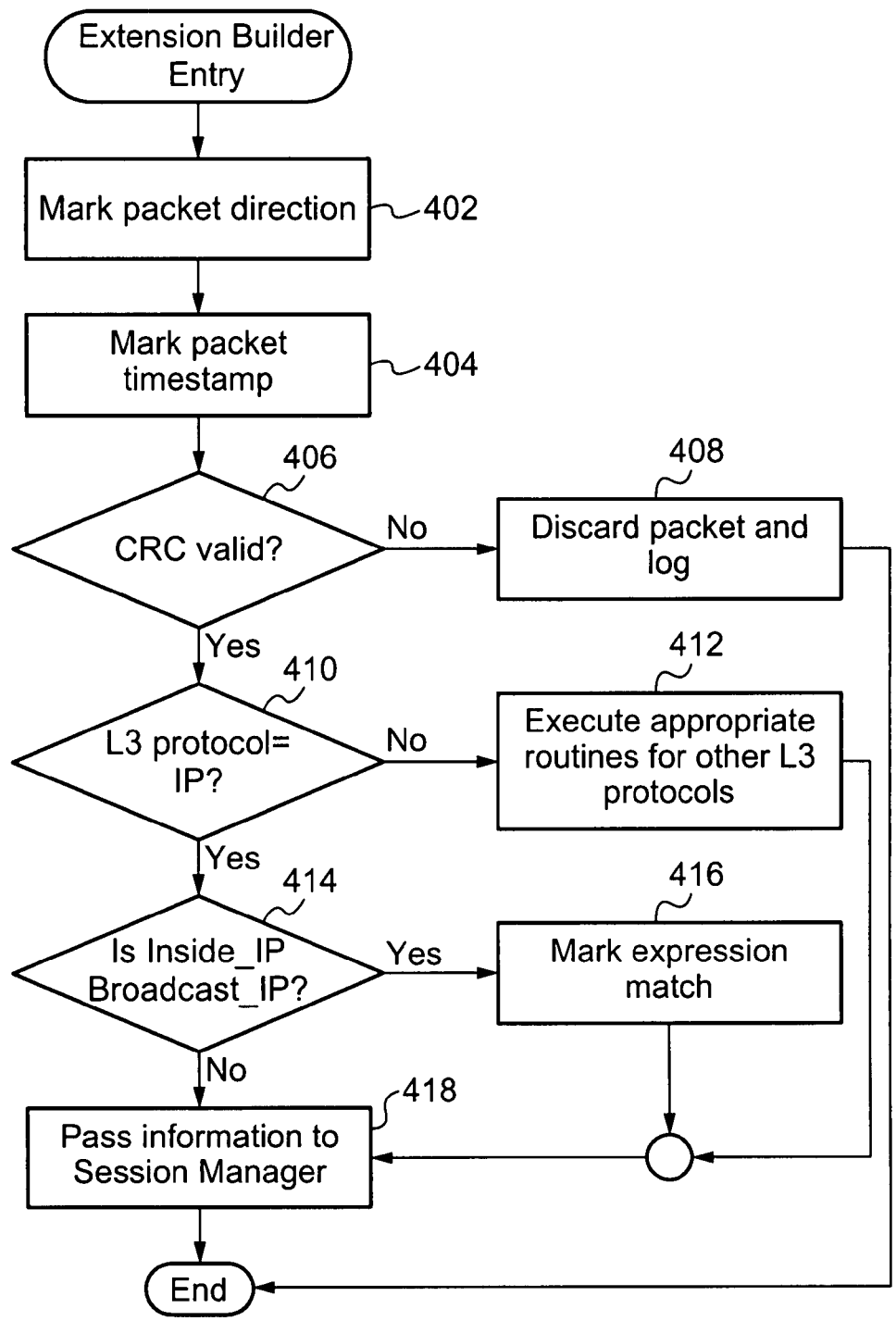
FIG. 4 is a flow diagram illustrating an embodiment of extension builder processing in the policy agent in accordance with the present invention.

The flow diagram of FIG. 4 illustrates an embodiment of processing packets in the extension builder module. As introduced above, among other things, this module analyzes the various headers and interprets the header fields so the other modules do not have to perform the same task. The incoming packet is received and is appended with the extension using conventional packet appending techniques. The extension may be variously "marked" by placing appropriate values at appropriate bit locations. Initially the direction of the packet is marked 402 based on the interface on which it is received. As with many of the appended marks, the determination of this condition at the outset and corresponding marking allows all subsequent processing modules to simply check the appropriate bit location in order to determine the packet direction. This avoids repetitious determinations, and one can readily see the further advantages of marks that are provided for this and various alternative determinations. The packet timestamp may be marked 404 as indicated, if desired, although such is not necessary to an understanding of this invention. The timestamp may be part of a condition, although it is not a condition in one of the described example rules. However, there will be applications for this condition. For example, an IDS policy agent may detect some denial of service attacks using packet timestamp information.

A conventional packet error (e.g., CRC) determination 406 and corresponding discarding and logging of packets indicating data transmission errors is conducted, followed by a determination 410 that the processed packet is an IP protocol packet.

If the packet is not IP, then routines appropriate for other L3 protocols can be executed 412, with appropriate marking of the extension to reflect any and all determinations. Once instructed in accordance with this invention, the artisan will readily recognize what can be determined, which will be dictated by the particular policy rules being enforced. Additionally, a system can implement any packet extension format that is deemed desirable.

In that sense, the flow diagram of FIG. 4 merely provides an example of processing and the invention is not limited thereto. Where an IP packet is determined 410 it can then, for example, be determined 414 whether the inside IP address is an IP_Broadcast address. This determination can also be marked 416 in the extension. This condition may be relevant to rules such as R6 in the example. Inside IP address refers to the address within the subject network. It can be the source or the destination of a packet. As an alternative to the L3 determination, this condition may be similarly monitored by L2 examination of the MAC address to determine whether it is a broadcast address. In either case, the packets can be appropriately marked according to the determination.

Figure 5A:
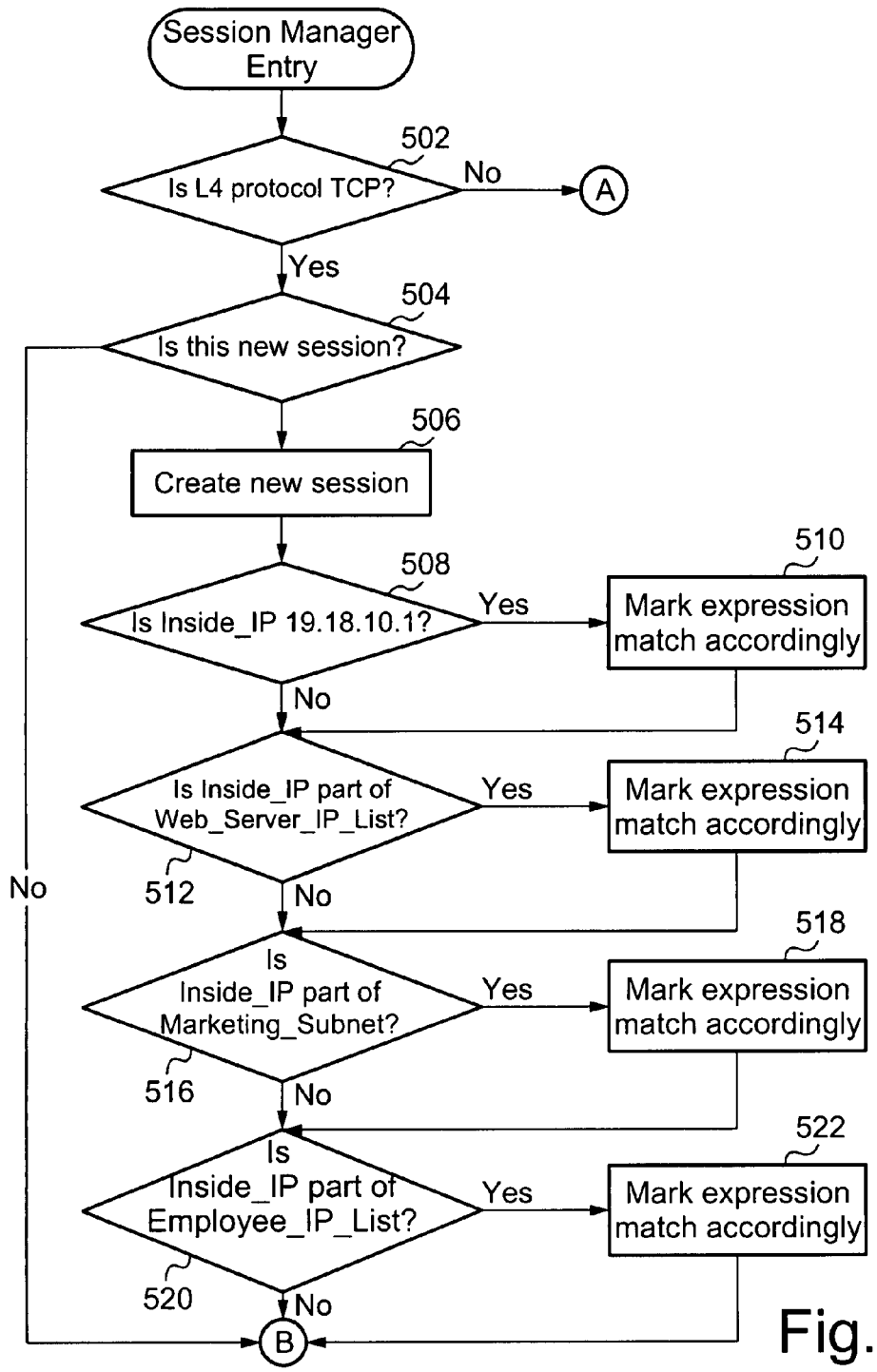
FIGS. 5A-B are flow diagrams illustrating an embodiment of session manager processing in the policy agent in accordance with the present invention.
Figure 5B:
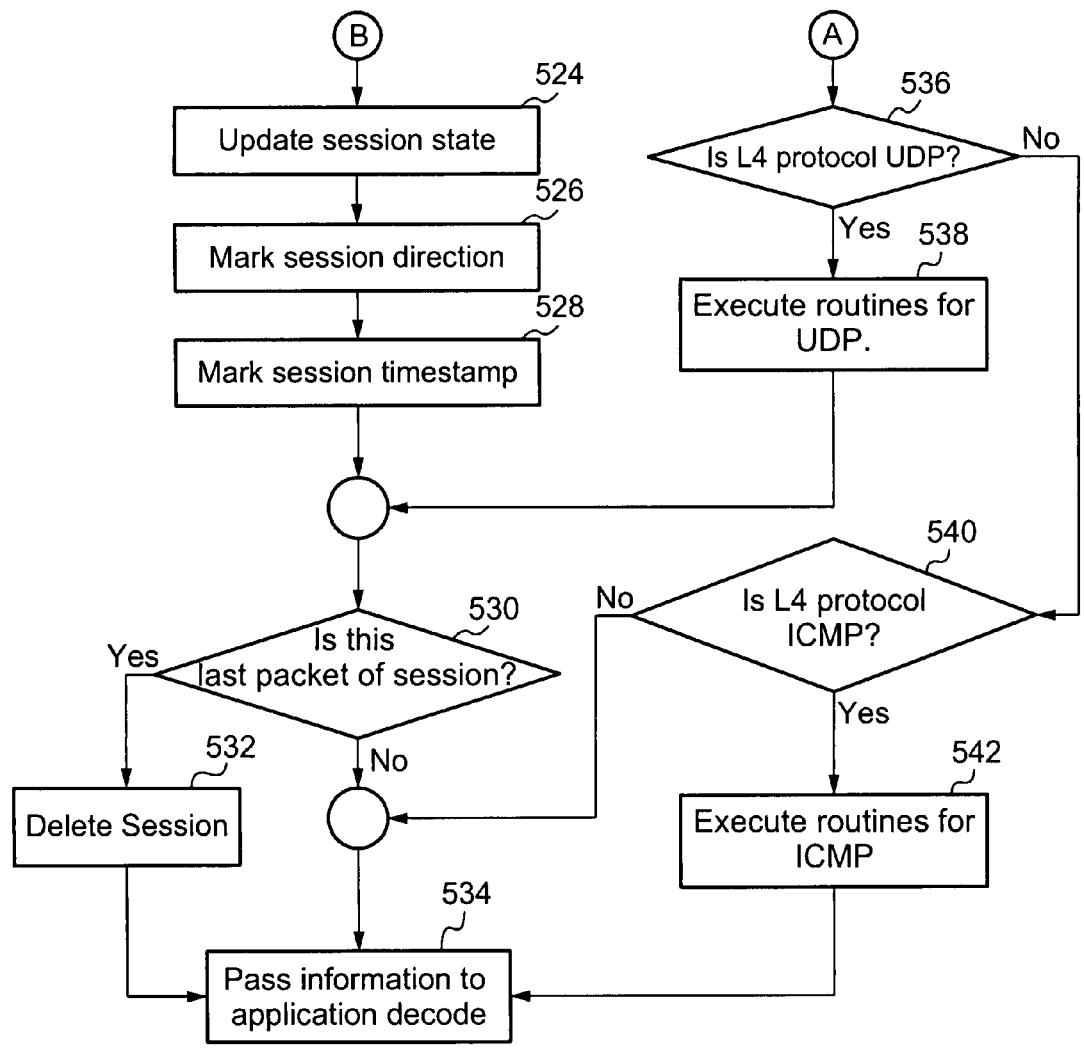

The packets are then passed from the extension builder to the session manager. The flow diagrams of FIGS. 5A-B illustrate an embodiment of session manager processing in accordance with the present invention. The session manager uses the L4 protocol information provided by the extension builder to build a virtual session or identify a packet belonging to an existing session. An initial determination 502 is made as to whether the L4 protocol for the processed packet is TCP. Where it is determined that it is a TCP packet, then it is determined 504 whether the packet corresponds to a new session, using conventional packet processing techniques. Where it is determined that the packet corresponds to a new session, a new virtual session is created 506. Then, determinations are made regarding the destination of the packet. Although various sequences may be provided, and the determinations will vary dependent upon the underlying rules and commonalities being analyzed, FIG. 5a initially depicts a determination 508 whether the Inside_IP address is 19.18.10.1. Referring to Table 1.0, one of the conditions in R1 is whether the Inside_IP address is 19.18.10.1. The address may be determined by examining the destination IP address for an incoming packet.

Where it is determined 508 that there is an address match, then the extension for the packet is marked 510 accordingly. Again, bit location(s) in the appended extension corresponding the destination IP address will be updated to reflect the determined value (or the indication of satisfaction of a particular value). That is, particular bit locations designated as containing the Inside_IP address may be provided, wherein the particular bit locations would contain the information 19.18.10.1 in the described example. Alternatively, where a match is detected, the condition of Inside_IP=19.18.10.1 can also be marked in the extension, by updating a predetermined bit location or locations. With this alternative, a number of bits can encode a number of corresponding conditions. For instance, two bits could encode the information that Inside_IP=no match (00), Inside_IP=first value (e.g. 19.18.10.1) (01), Inside_IP=second value (10) or Inside_IP=third value. The artisan will recognize the various alternatives.

With any of the alternatives, the extension contains the appropriate information and duplicative inquiries are avoided. Additionally, whenever a partial or full match corresponding to R1 is desired, the system may look to this bit location for a rapid determination of condition satisfaction for that rule.

Similarly, determining 512 whether the Inside_IP address corresponds to a Web_Server_IP_List, determining 516 whether the Inside_IP address corresponds to a Marketing_Subnet, and determining 520 whether the Inside_IP address corresponds to a particular Employee_IP_List identifies other recipient information. The various address lists will typically by determined by the customer network. For example, a network administrator may maintain the address lists. In such an example, the network administrator may update the lists, and the particular rules will automatically carry over to the new entries. Matching determinations are made by examining the addresses in the particular lists to determine inclusion of the Inside_IP address.

These determinations variously correspond as conditions found in rules R2, R3 and R4 illustrated in Table 1.0. Again, these determinations merely illustrate an example, and the invention is not necessarily so limited to the rules or particular conditions found in those rules.

Where matches are found, the appended packet extension is again updated to reflect the matches. Particularly, each determination 512, 516, 520 of a match prompts a corresponding marking 514, 518, 522 of the extension to regarding the condition, again at predetermined bit locations corresponding to each condition.

It is worth noting at this point that the determination of a match in one aspect may dictate the mapping of bit locations to conditions for a remaining portion of the appended extension. To illustrate this simply, if it is determined that the packet is a TCP packet, a bit location $N_1$ may be marked accordingly. Where $N_1$ indicates a TCP packet, bit locations $N_2$-$N_8$ may correspond to conditions particular to other determinations relevant to TCP packets. If it is determined that the packet is not a TCP packet, then $N_1$ would not reflect such. However, $N_2$ through $N_8$ might still be used to identify other conditions. These nested mappings allow the overall size of the extension to be most efficiently sized and/or used.

The functionality of the session manager is now further described with reference to the flow diagram of FIG. 5b. After all of the relevant determinations 508, 512, 516, 520 for the TCP packet are made and the corresponding markings 510, 514, 518, 522, as denoted after entry point "B", the session state is then updated 524 using conventional techniques. The session direction is marked 526, and the session timestamp is marked 528. These markings are merely shown as examples and can variously correspond to conditions found in rules. For example, R1 and R3 include a condition that the session direction is incoming, whereas R2 and R4 include a condition that the session direction is outgoing. A single bit location in the packet extension may indicate the session direction by taking on a first value for outgoing and a second value for incoming session directions, or other alternatives may be applied as recognized by the artisan. As another example, the timestamp information may be relevant to logging various activities, and/or determining the presence of certain types of attacks.

If it is determined 530 that the packet was the last of the session, then the virtual session may be deleted 532 for handling of the next session. There may also be embodiments where the "virtual" session is actually implemented as the "real" session, wherein the session may remain valid for other uses. In either event, any collected information regarding conditions can be passed 534 to the application decode engine as the extensions will retain the information stored in association with the packets. The session manager may also establish a session identifier for a session, preferably upon processing the first packet in a new session. There, the session manager marks bit locations in the packet extension corresponding to a Session_ID field so that other modules may identify the session corresponding to a packet. The other modules, such as the application decode engine, can then rely upon the Session_ID value in order to also track which session a packet corresponds to. The other modules may also establish their own tables for processing particular sessions. Thus, when the session is deleted by the session manager, it is only deleted as far as its processing by the session manager is concerned.

Protocols other than TCP may be examined as well. Referring to entry point "A", where it is determined that the packet is not a TCP packet, then a determination 536 is made as to whether the L4 protocol is UDP. If it is determined 536 that the L4 protocol is UDP, then routines particular to UDP packets are executed 538. Similarly, where it is determined 540 that the L4 protocol for the packet is Internet Control Message Protocol (ICMP), the routines particular to ICMP packets are executed 542. The determinations as to packet types are accomplished using conventional packet processing techniques. Other types of packets may be analyzed, even where it is determined that the packet is not TCP, UDP or ICMP. The artisan will recognize how such packets would be detected and analyzed for the presence of other conditions.

Once the packet type determinations are made, additional conditions may be examined and the extension may be marked accordingly, as described previously regarding TCP packets. Again, the rules and corresponding conditions will dictate the determinations. For example, R6 entails conditions that the packet is an ICMP packet and the packet direction is incoming. Similarly, the results found in the session manager are passed along to the application decode engine.

Figure 6:
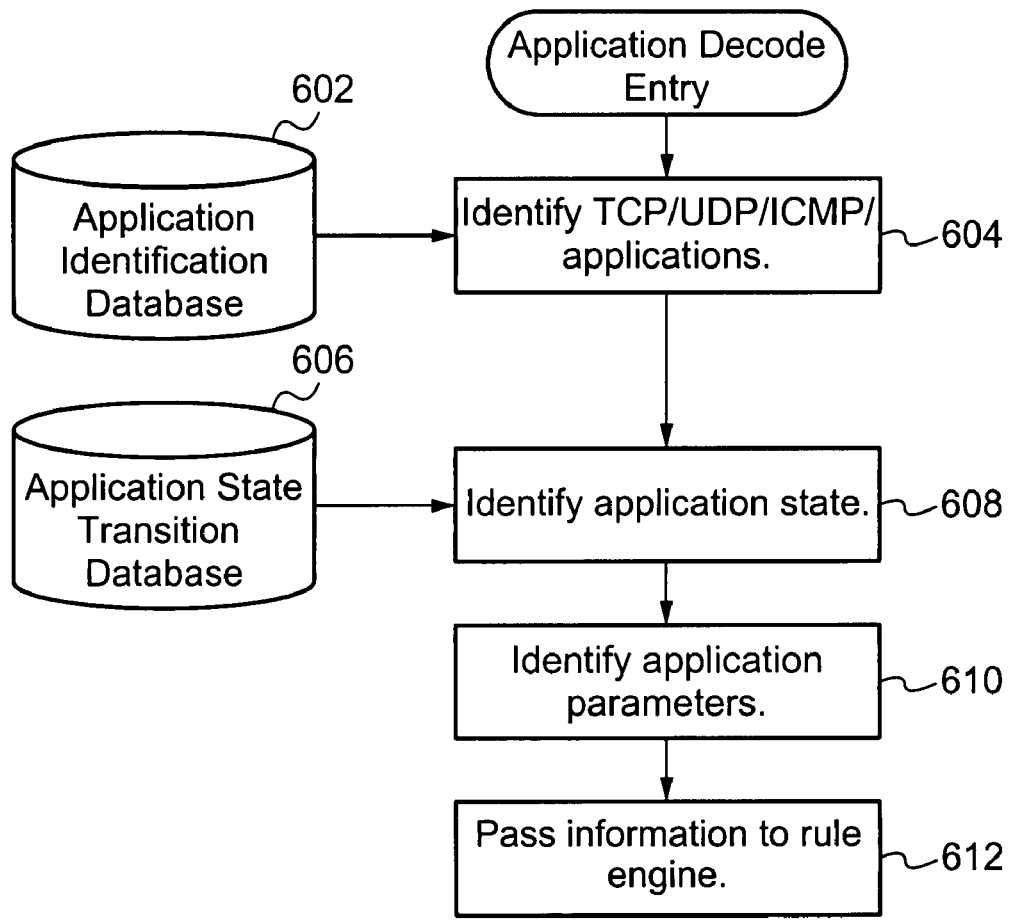
FIG. 6 is a flow diagram illustrating an embodiment of application decode processing in the policy agent in accordance with the present invention.

FIG. 6 illustrates an embodiment of application decode engine processing in accordance with the present invention. The application decode engine uses the information gathered by the extension builder and session manager and conducts further examination of the packet stream at the application level. Preferably, the application decode engine includes functionality corresponding to the targeted applications. It does not necessarily have to include all of the functionality underlying a potential application, only enough to identify an application and to decode the stream of packets to a level necessary for the determination of conditions. Thus, for example, the application decode engine will include sufficient functionality to identify the presence of an HTTP application and enough application execution functionality to determine any necessary parameters. To that end, the application decode engine may include an application identification database 602 and an application state transition database 606. The application identification database includes information that is used to map a packet or stream of packets to the targeted applications. The application state transition database 606 maps the state of an identified application and provides corresponding transitions based upon the state.

Referring to the flow diagram, the application is identified 604 by accessing the information in the application identification database 602. A simple example of information that may be used to determine an application is an examination of port information from a packet. Particularly, a determination of port 80 for a TCP packet prompts a corresponding determination that the application is an HTTP application. The artisan will recognize the alternative types of information needed to identify the applications corresponding to one or more packets. Identification of the application can be made in the packet extension in the same fashion as was applied by the extension builder and session manager modules—by providing the appropriate value(s) in the appropriate predetermined bit location(s).

The application state is then identified 608 in conjunction with the application state transition database 606. This may be done by using application commands and data information within a packet or stream of packets. The necessary application parameters can then be identified 610. Non-limiting examples of the types of gathered information include user information, user actions, and data (file) information. For example, an individual might have certain limitations regarding certain HTTP transactions according to a rule. Assuming that user is identified by the username "John," a username parameter found at the HTTP level can be examined to detect the username John and thus a match. Where a match is detected, then the corresponding packet or packet extensions are updated to reflect the correspondence of the packet(s) to the condition.

R4 indicates an example of some conditions that may be examined by the application decode engine. There, a rule corresponding to a group of users identified as the marketing group has as a condition an identification of a particular set of applications and a determination as to whether a time of day criteria is satisfied. The application identification database 602 includes information that identifies the application. The identified application is cross-referenced with a list of applications kept under the label Mkt_App_Grp. One condition is met by a determination that the identified application is found in the list of applications. Additionally, a determination as to whether the current time of day falls within a range defined as work_hours satisfies an additional condition.

The types of applications to be targeted and the corresponding conditions in rule expressions will dictate the functionality of the application decode engine. To process the example rules discussed above in Table 1.0, this application decode module will identify the various TCP applications such as HTTP, FTP or application ID 139. If the L4 protocol is ICMP then it can identify the ICMP code passing over the packet such as Code 8. The result of all this analysis is then passed 612 to the rule engine.

Although the application decode engine may be variously provided, further description of one example of an application decode engine can be found in application Ser. No. 09/956,394, filed on Sep. 18, 2001, and entitled "Universal Application Decode Engine," the entire contents of which is hereby incorporated by reference.

Figure 7:
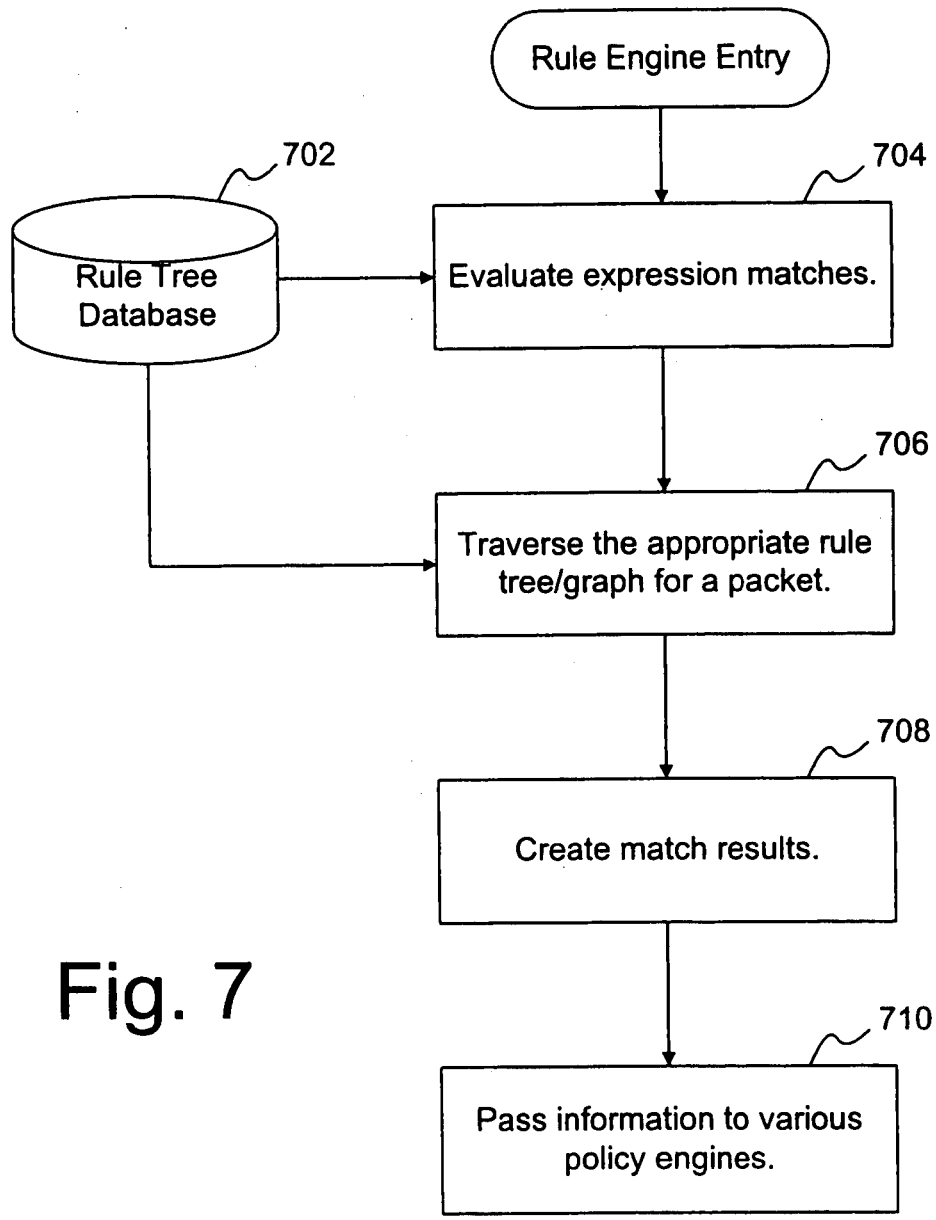
FIG. 7 is a flow diagram illustrating an embodiment of rule engine processing in the policy agent in accordance with the present invention.

The rule engine receives the processed packets and uses rule trees to apply the various policy rules to the packets. FIG. 7 illustrates an embodiment of rule engine processing in accordance with the present invention. The rule engine functionality applies the rule trees for its policy agent to determine the applicability of the rules according to the conditions found by the infrastructure modules.

Figure 9A:
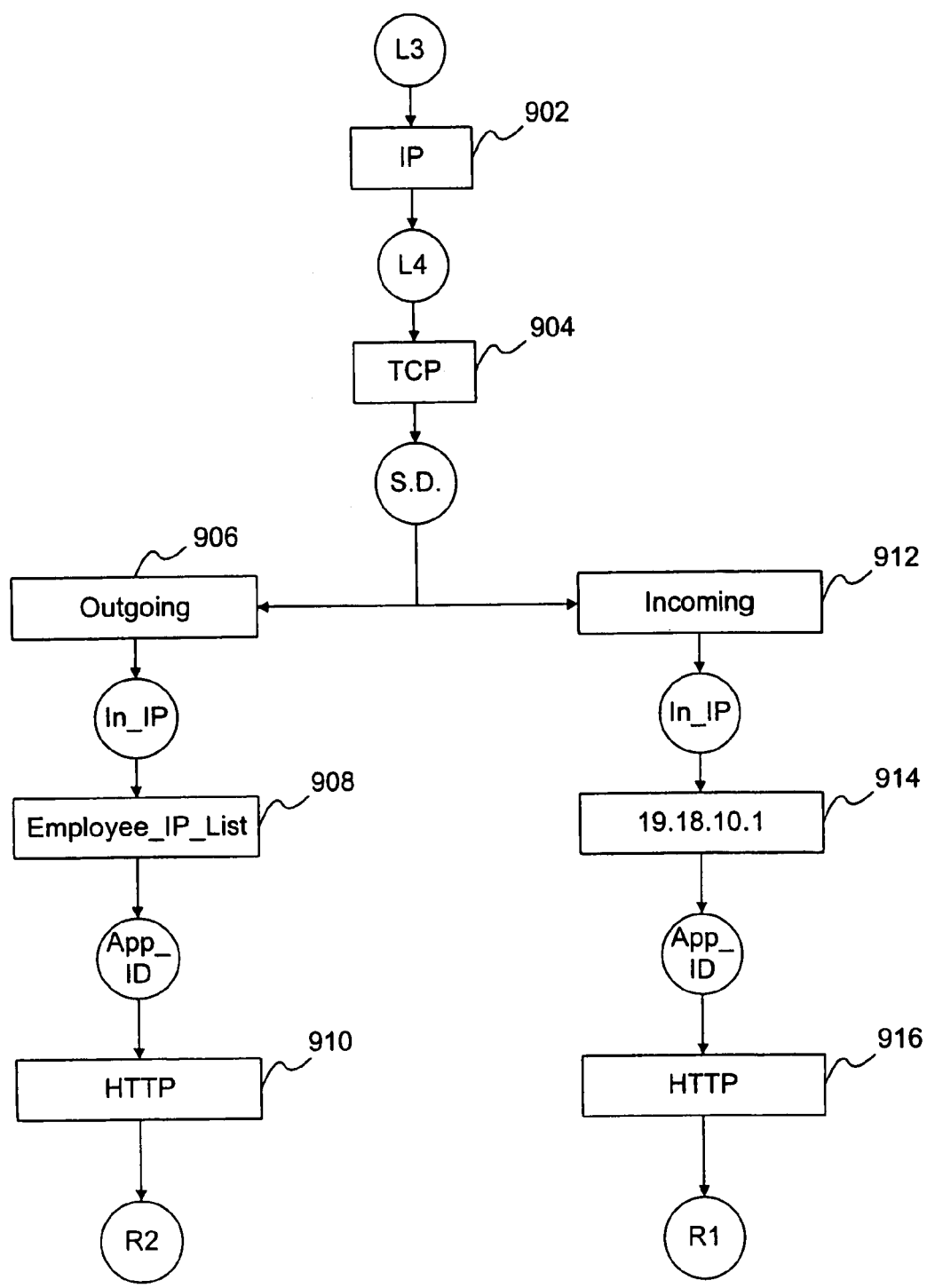
FIGS. 9A-9B are examples of rule trees for particular policy types in accordance with the present invention.
Figure 9B:
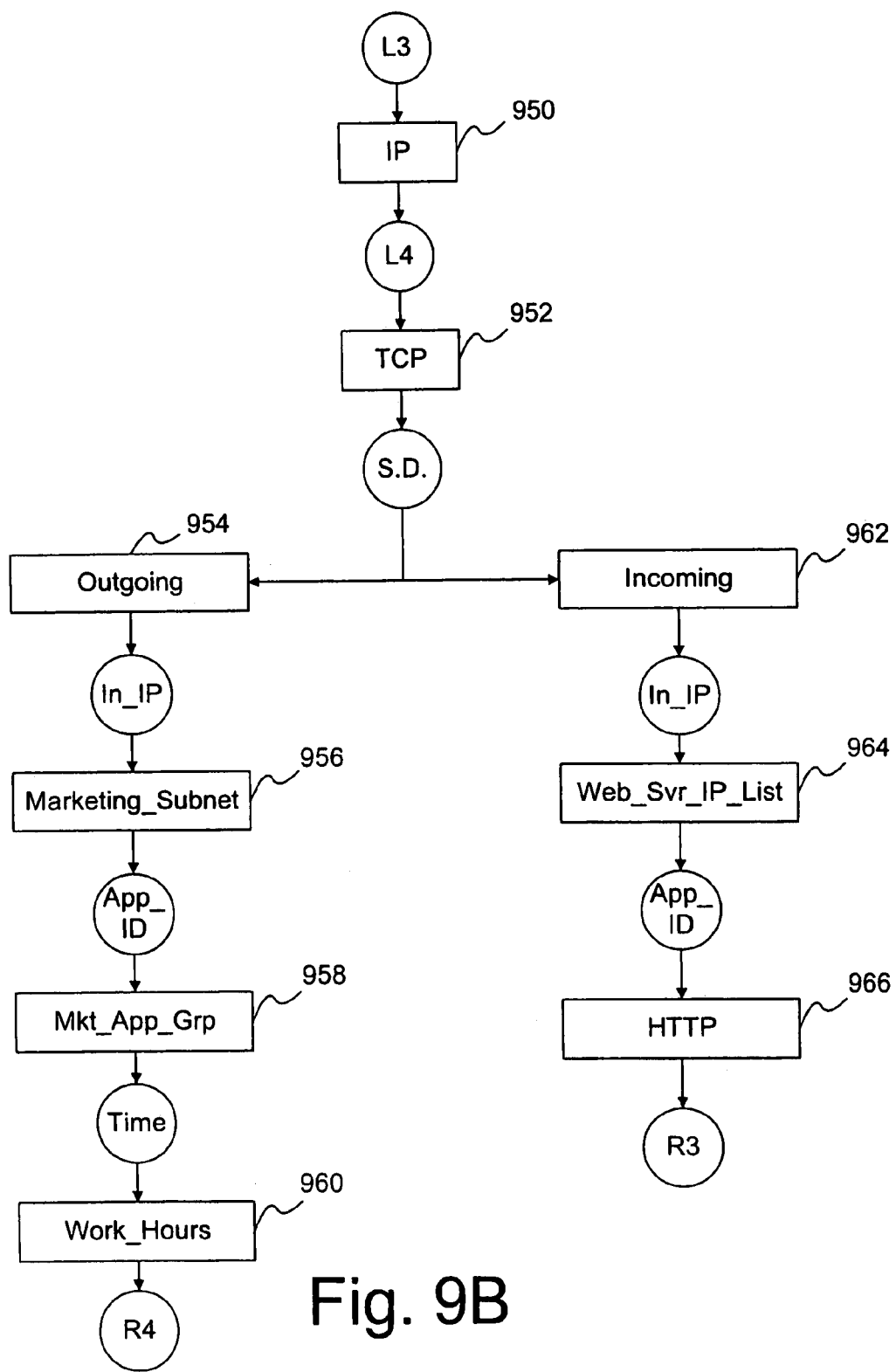

FIGS. 9A-9B respectively illustrate rule trees for the FW and QoS policy types described above and correspond to the example provided in Table 1.0. Particularly, the FW rule tree of FIG. 9A corresponds to the FW rules (R1, R2). A rule comprises a set of conditions, which may also be referred to as expression-value pairs. For example, the expression might be L3 protocol and the value might be IP. The condition is that L3 protocol is IP. As is evident from the tree, the R2 expression is satisfied upon a determination of the following conditions: that the L3 protocol is IP (902); L4 protocol is TCP (904); Session Direction is outgoing (906); In_IP is from Employee_IP_List (908); and Application_ID is HTTP (910). Similarly, the R1 expression is satisfied upon a determination that the L3 protocol is IP (902); L4 protocol is TCP (904); Session Direction is In (912); In_IP is 19.18.10.1 (914); and Application_ID is HTTP (916). This tree is but an example. Trees can be optimized, including the one in the example. For example, the determination that the App_ID is HTTP could be moved up the tree so that the tree processing commonly inquires regarding same for both R1 and R2. As is evident from the tree, each rule has a particular branch. The same condition may appear along a particular branch portion for two or more rules. For example, the condition that the application is HTTP appears in each of the branches for R1 and R2. This does not mean that the condition is checked separately. In fact, it is preferable for an inspected packet to be checked a single time regarding this condition.

For policy compilation purposes, it will at times be preferable to leave the trees in hierarchical order so that conditions corresponding to processing layers may be more easily compiled. Trees could be optimized for particular policy engines after policy rule compilation in some embodiments.

The flow diagram of FIG. 9B illustrates an example QOS rule tree. The R3 expression is satisfied by the conditions that the L3 protocol is IP (950); the L4 protocol is TCP (952); the session direction is incoming (960); the inside IP address is among those on the Web_Svr_IP_List (964); and the application ID is HTTP (966). Similarly, the R4 expression is satisfied where the L3 protocol is IP (950); the L4 protocol is TCP (952); the session direction is outgoing (954); the inside IP address is among those in Marketing_Subnet (956), the application ID is included in the list defined under Mkt_App_Grp (958) and the time of day is within what is defined as Work_Hours (960).

Figure 10:
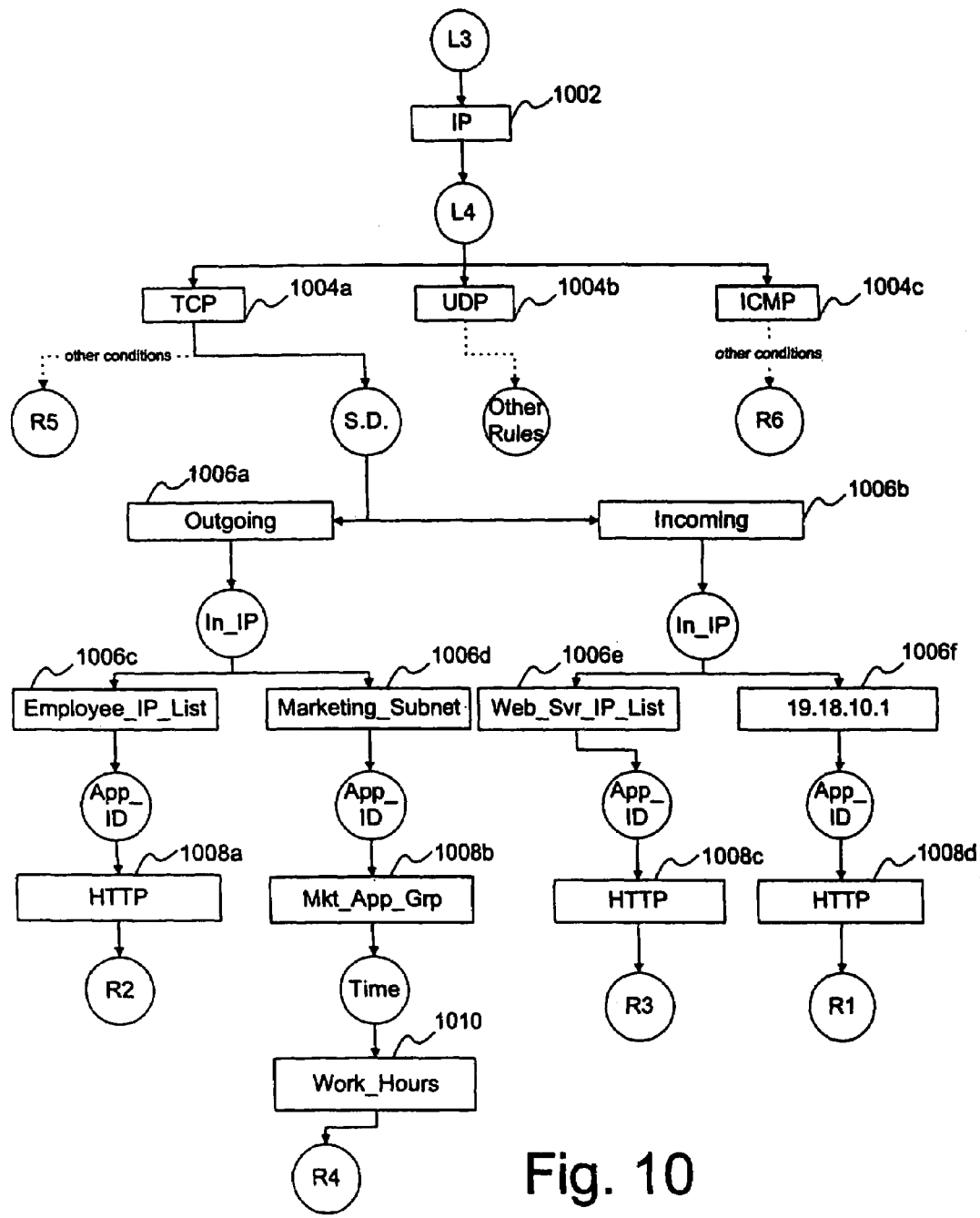
FIG. 10 is an example of a rule tree for multiple policy types in accordance with the present invention.

FIG. 10 illustrates an example of a rule tree for FW and IDS policy rules. It is a combined rule tree which can be provided by the previously described policy compiler, which receives all implemented user policies and develops an overall decision tree that can be used to identify common expressions and the like. Preferably, the combined rule tree functionality is implemented in the policy agent, although other embodiments may implement separate tree based functionality. The combined rule tree of FIG. 10 helps illustrate the commonalities across hierarchical processing layers. Referring to the tree, it is evident that at a first level (e.g., OSI L2/L3), a condition that an inspected packet is an IP packet (1002) may correspond to a number of policy rules from a number of policy types (here, each of rules R1-R4). At another level (e.g., OSI L4), conditions that the L4 protocol is TCP (1004*a*), UDP (1004*b*) and ICMP (1004*c*) are shown. At still another level (session layer), determinations regarding the session direction (1006*a*, 1006*b*) and the inside IP address for packets (1006*c-f*) are shown, and at yet another level, conditions regarding the identification of the application (1008*a-d*) are shown, as well as conditions such as the illustrated time of day criteria (1010). From this combined rule tree, commonalities at any given level are readily apparent, as are the collective conditions that would be analyzed at any given level, such as those respectively processed by the policy agent modules.

The present invention does not necessarily rely on a particular policy compiler. However, it may operate in conjunction with a policy compiler that receives and combines all of the expressions for all rules to be enforced, optimizes the resultant rule tree to minimize the number of hierarchical evaluation levels in the rule tree, and outputs the rule tree in a form usable by the policy agent.

Still referring to FIG. 7, each of the rule trees are accessed from the rule tree database 702 and the expression matches are evaluated 704. The packets do not have to be re-analyzed in order to evaluate expression matches. Rather, the rule engine has knowledge of the packet extensions and looks to the appropriate bit locations to make corresponding determinations. For each studied packet, the appropriate rule tree is traversed 706 and match results are created 708. For example, if the packet contains an HTTP request to a web server 19.18.10.1 and the other relevant conditions then the rule engine indicates an R1 match. Partial matches may also be indicated where the relevant portion of the tree according to a current or targeted level is successfully matched. The rule matching information is passed 720 to the various policy engines.

Figure 8:
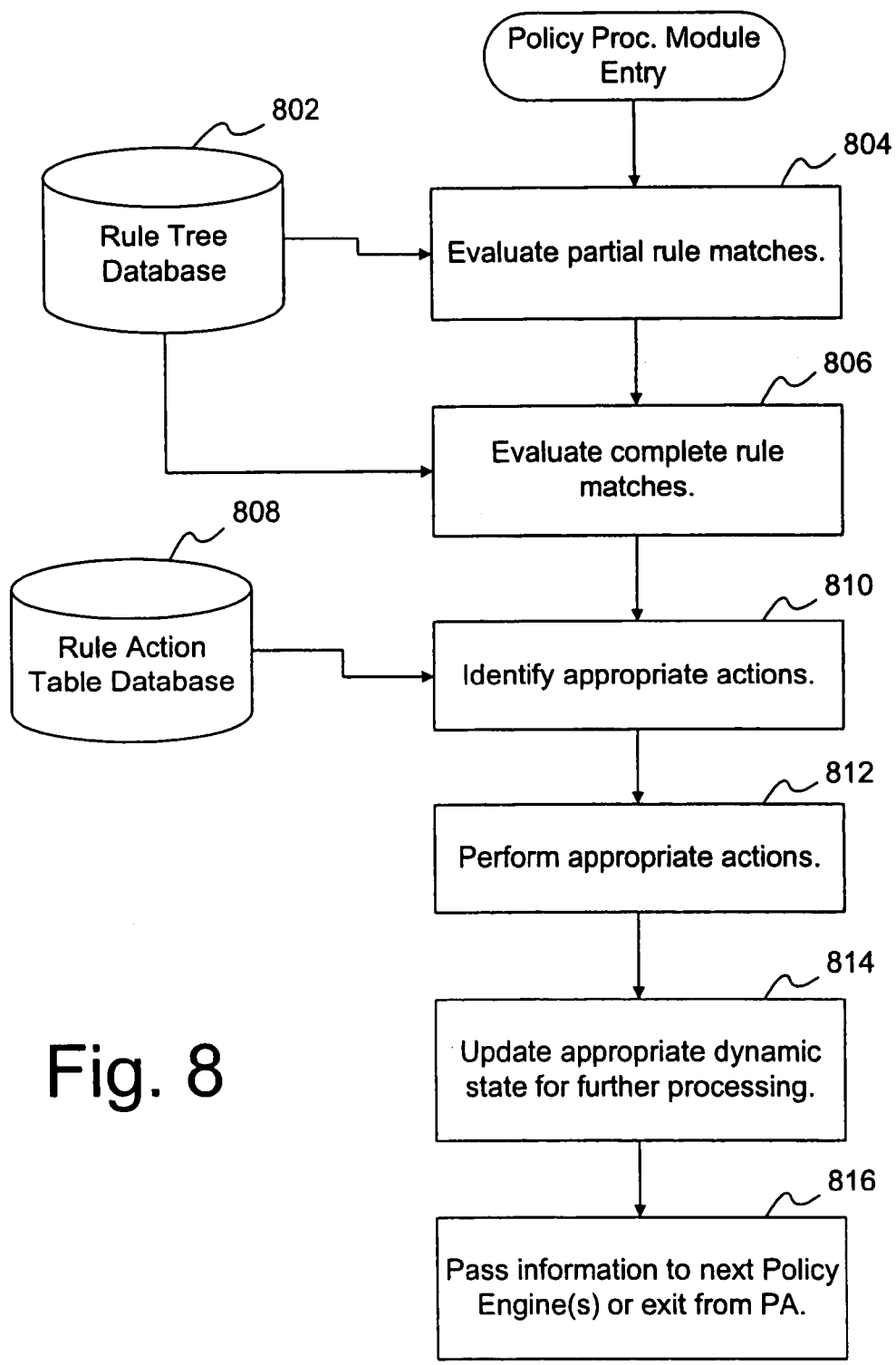
FIG. 8 is a flow diagram illustrating an embodiment of policy processing module functionality in the policy agent in accordance with the present invention.

Each policy processing module appropriately decides whether packet requires further processing or not. It also selects what actions to perform based on rule matching. FIG. 8 illustrates the operation of a policy processing module. Although rule matches may be passed to the policy processing module, the policy processing module may incorporate additional matching for partially matched rules, or may independently conduct the rule tree analysis in lieu of the rule engine. Accordingly, the policy processing module includes a rule tree database 802. The policy processing module also includes a rule action table database 808 which identifies the actions to be provided where rule matches are detected. These databases 802, 808 are shown separately for ease of discussion. They could be provided as an integrated database, or could be broken down into more than two databases. As was described regarding the rule engine, the policy processing module traverses the rule tree (e.g. the FW tree for the FW policy processing module, or the IDS rule tree for the IDS policy processing module) and evaluates 804, 806 partial and complete rule matches. The reason that the figure illustrates partial rule matches here is that there may be some policy specific processing that is required in order to determine a complete rule match. Additionally, there may be rules that traverse sessions or traverse packets (e.g., some data from a first packet might satisfy known conditions to provide partial rule matching, and additional data from another packet might satisfy additional conditions to provide the complete rule match. Once a rule match is established, the action corresponding to the rule is identified 808 through an examination of the rule action table database 808, and then the actions are performed 812. The dynamic state may be updated 814 for further processing as needed, whereupon access is passed to the next policy processing module, if any, or, where all policy processing modules have operated, the policy agent is exited 816.

The determination of rules and corresponding actions will vary. Continuing with the example, with the rules of Table 1.0, if R1 or R2 are matched then the FW policy module determines appropriate actions defined by the rules. Similarly, the QoS policy module determines a match for R3 and R4, and the IDS policy module determines a match for R5 and R6, each with appropriate actions where matches are found. More specifically, if the packet is for an incoming HTTP request to web server 19.18.10.1, among the other shown conditions, then the FW and QoS policy modules will respectively detect a matching condition for R1 and R3. In accordance with R1, the FW policy module allows packet to go through as requested. In accordance with R3, QoS allocates the appropriate bandwidth of 500 kbps. It will guarantee up to 500 kbps bandwidth based on R3 match. The QoS PE performs the calculation of allocated bandwidth. Since in this example matches for R2, and R4-R6 were not determined, the IDS and other policy modules would merely pass the packet through.

The artisan will recognize the various requirements for policy modules based upon the actions that they will enforce. These actions can be implemented using conventional techniques once applicability of the rules has been determined in accordance with the present invention. For example, an LB policy module will likely implement quick hash lookup capabilities whereas the IDS policy module will likely include extensive pattern matching capabilities, or perhaps a state machine for detecting the presence of a particular sequence of packets.

Table 2.0 above further illustrates the processing of certain particular packet streams along the pipelined architecture for the provided exemplary rules. This example is merely illustrative. If the rules in the examples were implemented, such would likely be a subset of all the rules typically found on a policy agent having with Firewall, IDS and QoS policy engine functionality enabled. It demonstrates how certain packets would be processed according to combined policies, and how the infrastructure sub modules process various components of the packet to aid in rule expression matching.

TABLE 2.0

Sample Data Packets Analysis

| Packet Information | Extension Builder Processing | Session Manager Processing | Application Decode Processing | Rule Engine Processing | Policy Proc. Module Processing | Remarks |
|---|---|---|---|---|---|---|
| Outgoing http request from employee machine | Mark L3 protocol is IP, L4 is TCP etc | Identify session direction, session id Inside_IP is part of which user group | Mark application is HTTP, establish application state and mark application transaction | Match that L3 in extension is IP, L4 as marked in extension is TCP, user group marked in extension is employee_IP_list, session direction marked is outgoing, application marked id HTTP Verify if all the expressions matched, mark as if only R2 match | Firewall PE must allow packet based on R2 match, No QoS or IDS action required | Any response to this request will be allowed by FW as the rule engine will mark the same rule matched (R2) |
| UDP Packet with destination ip as broadcast IP | Mark L3 protocol is IP, L4 is UDP mark destination IP is broadcast IP | identify appropriate session state and id | mark appropriate application | Based on destination IP being the broadcast IP but L4 being UDP no rule match | Firewall PE must reject packet since R1 and R2 did not match. No QoS or IDS Action required | Firewall rejects everything unless specifically permitted |
| Incoming ICMP Packet with destination ip as broadcast IP & ICMP Code as 8 | Mark L3 protocol is IP, L4 is ICMP, destination IP is broadcast IP, ICMP code is 8 | Identify the session id, | No application decode done | Based on destination IP being the broadcast IP and L4 being ICMP along with code being 8 rule 6 match | Firewall PE must reject packet since R1 and R2 did not match. No QoS required and Since R6 match IDS Attack detected, IDS must raise appropriate alarm | Firewall rejects everything unless specifically permitted |

Thus, methods and apparatus for enforcing a plurality of policies on a stream of packets are provided in accordance with the present invention. Although the present invention has been described in considerable detail with reference to certain preferred embodiments thereof, other embodiments are possible. Therefore, the sprit and scope of the appended claims should not be limited to the description of the preferred embodiments contained herein.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of the above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems appears in the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A method for enforcing a plurality of different policies on a stream of packets, the method comprising:
    receiving a packet in a packet-switched network;
    appending an extension to the packet;
    determining session information regarding the packet;
    updating the extension with the session information;
    forwarding the packet to a packet policy rule engine module;
    determining, at the packet policy rule engine module, whether the packet corresponds to a common condition for a first policy rule and a second policy rule, the first policy rule belonging to a first policy type and the second policy rule belonging to a second policy type that differs from the first policy type;
    providing, at the packet policy rule engine module, an association between the first packet and the common condition where it is determined that the packet corresponds to the common condition; and
    updating the extension with the association, wherein communication between modules of said packet-switched network using said extension occurs without use of shared memory.

2. The method of claim 1, further comprising:
    forwarding the packet to an application decode engine module;
    determining, at the application engine decode module, whether the packet corresponds to an application rule;
    if the packet corresponds to an application rule, at the application engine decode module, updating the extension with application information from the application rule; and
    wherein said forwarding the packet to a packet policy rule engine module includes forwarding the packet from the application engine decode module to a packet policy rule engine module.

3. The method of claim 1, wherein the first policy type is a firewall policy and the second policy type is a quality of service policy.

4. The method of claim 1, wherein the first and second policy types are selected from the following policy types: firewall, quality of service, intrusion detection.

5. The method of claim 1, further comprising:
    determining whether the packet corresponds to a first particular condition for the first policy rule as compared to the second policy rule; and
    determining applicability of the first policy rule to the packet where it is determined that the common condition and the first particular condition correspond to the packet.

6. The method of claim 5, wherein determining applicability of the first policy rule to the packet comprises:
    traversing a rule tree corresponding to the first policy rule, the rule tree having a first path corresponding to the first rule, the first path including the common condition and the first particular condition, wherein presence of the common condition and the first particular condition prompts a determination that the first policy rule is applicable to the packet.

7. The method of claim 1, wherein said appending an extension to the packet occurs at an extension builder module.

8. The method of claim 7, wherein said determining session information regarding the packet and said updating the extension with the session information occur at a session manager module.

9. An apparatus for enforcing a plurality of different policies on a stream of packets, the apparatus comprising:
    means for receiving a packet in a packet-switched network;
    means for appending an extension to the packet;
    means for determining session information regarding the packet;
    means for updating the extension with the session information;
    means for forwarding the packet to a packet policy rule engine module;
    means for determining, at the packet policy rule engine module, whether the packet corresponds to a common condition for a first policy rule and a second policy rule, the first policy rule belonging to a first policy type and the second policy rule belonging to a second policy type that differs from the first policy type;

means for providing, at the packet policy rule engine module, an association between the first packet and the common condition where it is determined that the packet corresponds to the common condition; and means for updating the extension with the association, wherein communication between modules of said packet-switched network using said extension occurs without use of shared memory.

10. The apparatus of claim 9, further comprising:

means for forwarding the packet to an application decode engine module;

means for determining, at the application engine decode module, whether the packet corresponds to an application rule;

means for, if the packet corresponds to an application rule, at the application engine decode module, updating the extension with application information from the application rule; and wherein said means for forwarding the packet to a packet policy rule engine module includes means for forwarding the packet from the application engine decode module to a packet policy rule engine module.

11. The apparatus of claim 9, wherein the first policy type is a firewall policy and the second policy type is a quality of service policy.

12. The apparatus of claim 9, wherein the first and second policy types are selected from the following policy types: firewall, quality of service, intrusion detection.

13. The apparatus of claim 9, further comprising:

means for determining whether the packet corresponds to a first particular condition for the first policy rule as compared to the second policy rule, determining applicability of the first policy rule to the packet where it is determined that the common condition and the first particular condition correspond to the packet.

14. The apparatus of claim 13, wherein determining applicability of the first policy rule to the packet comprises traversing a rule tree corresponding to the first policy rule, the rule tree having a first path corresponding to the first rule, the first path including the common condition and the first particular condition, wherein presence of the common condition and the first particular condition prompts a determination that the first policy rule is applicable to the packet.

15. The apparatus of claim 9, wherein said means for appending an extension to the packet builder includes an extension builder module.

16. The apparatus of claim 15 wherein said means for determining session information regarding the packet and said means for updating the extension with the session information include a session manager module.

17. An apparatus for enforcing a plurality of different policies on a stream of packets, the apparatus comprising:

an extension builder module configured to receive a packet in a packet-switched network, appending an extension to the packet, and forward the packet to a session manager module;

said session manager module configured to receive the packet, determine session information regarding the packet, update the extension with the session information, and forward the packet to an application decode engine module;

said application decode engine module configured to determine if the packet corresponds to an application rule, update the extension with application information from the application if the packet corresponds to an application rule, and forward the packet to a packet policy rule engine module; and said packet policy rule engine module configured to determine whether the packet corresponds to a common condition for a first policy rule and a second policy rule, the first policy rule belonging to a first policy type and the second policy rule belonging to a second policy type that differs from the first policy type, provide an association between the first packet and the common condition where it is determined that the packet corresponds to the common condition, and update the extension with the association, wherein communication between modules of said packet-switched network using said extension occurs without use of shared memory.

18. The apparatus of claim 17, wherein the first policy type is a firewall policy and the second policy type is a quality of service policy.

19. The apparatus of claim 17, wherein the first and second policy types are selected from the following policy types: firewall, quality of service, intrusion detection.

20. The apparatus of claim 17, wherein said packet policy rule engine module is further configured to:

determine whether the packet corresponds to a first particular condition for the first policy rule as compared to the second policy rule; and determine applicability of the first policy rule to the packet where it is determined that the common condition and the first particular condition correspond to the packet.

21. The apparatus of claim 20, wherein the packet policy rule engine module is further configured to traverse a rule tree corresponding to the first policy rule, the rule tree having a first path corresponding to the first rule, the first path including the common condition and the first particular condition, wherein presence of the common condition and the first particular condition prompts a determination that the first policy rule is applicable to the packet.

22. A program storage device readable by a machine, embodying a program of instructions executable by the machine to perform a method for enforcing a plurality of different policies on a stream of packets, the method comprising:

receiving a packet in a packet-switched network;

appending an extension to the packet;

determining session information regarding the packet;

updating the extension with the session information;

forwarding the packet to a packet policy rule engine module;

determining, at the packet policy rule engine module, whether the packet corresponds to a common condition for a first policy rule and a second policy rule, the first policy rule belonging to a first policy type and the second policy rule belonging to a second policy type that differs from the first policy type;

providing, at the packet policy rule engine module, an association between the first packet and the common condition where it is determined that the packet corresponds to the common condition; and updating the extension with the association, wherein communication between modules of said packet-switched network using said extension occurs without use of shared memory.

* * * * *